UNITED STATES PATENT OFFICE.

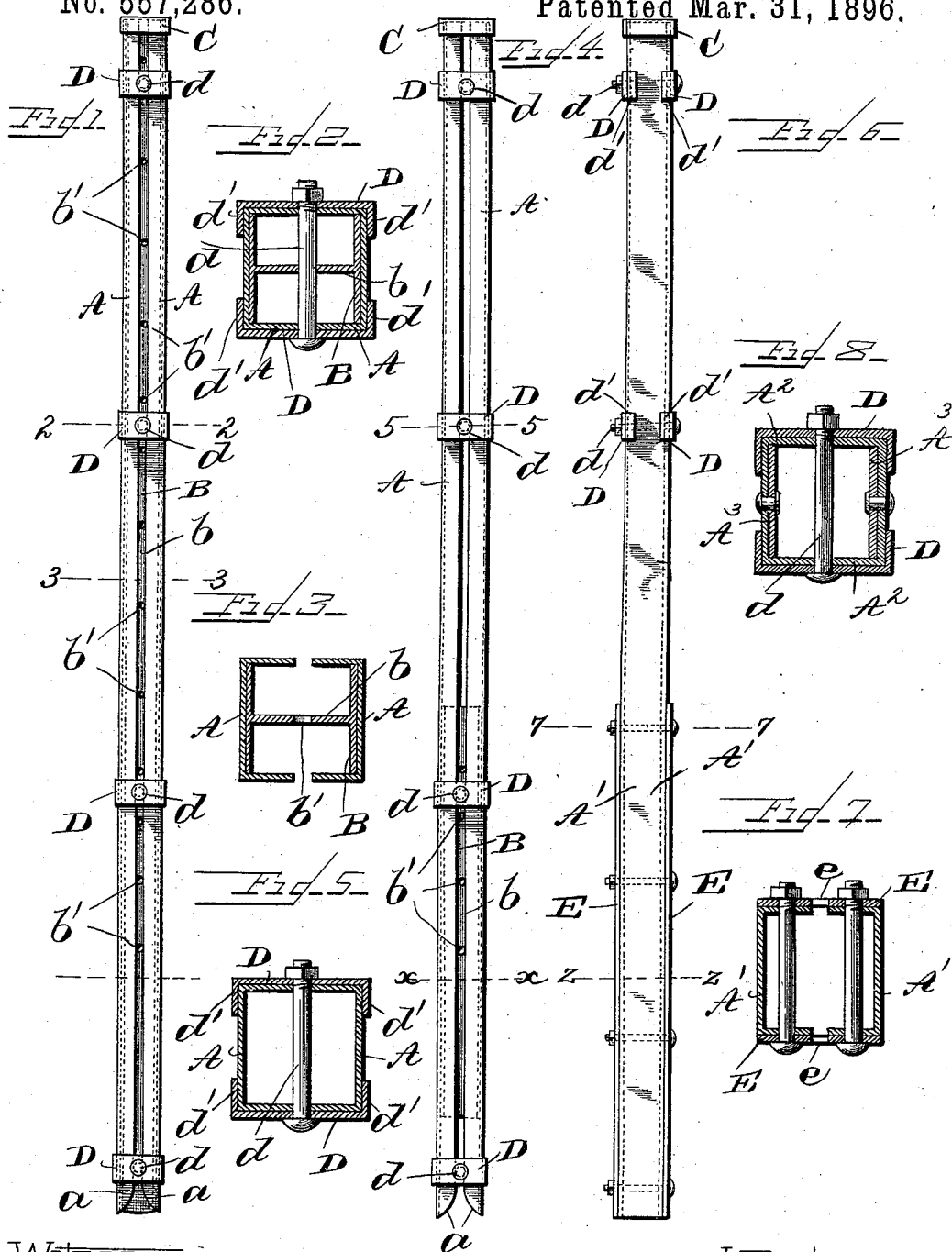

RICHARD B. ROBBINS, OF ADRIAN, MICHIGAN.

FENCE-POST.

SPECIFICATION forming part of Letters Patent No. 557,286, dated March 31, 1896.

Application filed August 29, 1895. Serial No. 560,895. (No model.)

*To all whom it may concern:*

Be it known that I, RICHARD B. ROBBINS, a citizen of the United States, residing at Adrian, in the county of Lenawee and State of Michigan, have invented certain new and useful Improvements in Fence-Posts; and I do hereby declare the following to be a full, clear, and exact description of the invention, such as will enable others skilled in the art to which it appertains to make and use the same.

My invention consists in the novel features of construction and combination of parts hereinafter fully described, reference being had to the accompanying drawings, which illustrate one form in which I have contemplated embodying my invention and modifications thereof, and said invention is fully disclosed in the following description and claims.

Referring to the said drawings, Figure 1 is an elevation of a fence-post constructed according to my invention. Fig. 2 represents a horizontal section of the post on line 2 2 of Fig. 1. Fig. 3 represents a similar sectional view on line 3 3 of Fig. 1. Fig. 4 is a view similar to Fig. 1, showing a slightly-modified form of post. Fig. 5 represents a section on line 5 5 of Fig. 4. Fig. 6 is a view similar to Fig. 1, showing another slightly-modified form of post. Fig. 7 represents a section on line 7 7 of Fig. 6. Fig. 8 represents a similar section of another slightly-modified form of post.

In making my improved fence-post I employ two pieces of channel-iron A A of a length equal to the desired length of the post, and secure them together with their flanges extending toward each other, but having a longitudinal aperture between them.

In the form of post shown in Fig. 1 I provide a piece of H-iron B having a central web $b$, which is provided with a series of perforations $b'$ for the passage of the fence-wires and having its flanges of a width to engage the inside face of the channel-irons A and fit between the lateral flanges thereof, as clearly shown in Fig. 3. In order to secure the parts rigidly together, I employ a series of clamping devices, each of which consists of a pair of flanged clamping-plates D, provided with retaining projections $d'$ to prevent the separation of the channel-irons, and connected by a bolt $d$ and nut, the flanged plates engaging the outside faces of the lateral flanges of the channel-irons and the bolt passing between the adjacent edges of the said flanges and through an aperture in the web of the H-iron B, as clearly shown in Fig. 2. I have shown the post provided with four of these clamping devices, but the number will vary according to the length of the post. At its upper end the post is provided with a rectangular cap C, which is provided on all sides with a downwardly-extending flange fitting over the top of the post, and this cap may be secured to the post, if desired, in any usual manner or simply held in place by being driven on and fitting snugly. At its lower end the lateral flanges of the channel-iron are curved or beveled, as shown at $a$, to allow the post to be driven readily. It will be seen that this construction provides a very strong and rigid post, which will withstand immense lateral strains when inserted in the ground and anchored in any desired or usual manner, and I find it particularly desirable, on account of its rigidity, for use as an end or corner post in wire fences.

In some cases it will be found sufficient to have the H-iron, or "reinforcing-bar," as it may be appropriately termed, extend through the post only where it is subjected to the greatest strain, and in Fig. 4 I have shown a post entirely similar to the post illustrated in Fig. 1, except that the reinforcing-bar extends only slightly below and slightly above the ground-line, which is indicated by a dotted line $x\ x$. In this form of post the same form of clamping devices is employed as previously described, the channel-irons being held the required distance apart by the clamping-bolts themselves, which in this case will be directly engaged by the flanges of the channel-irons. (See Fig. 5.)

In Figs. 6 and 7 I have shown another slightly-modified form of post, in which I employ the channel-irons A' A', as in the other forms; but they are secured together, preferably adjacent to the ground-line $z\ z$, as indicated, by reinforcing-plates E E, which are bolted through the flanges of the channel-irons and are provided with apertures $e$ for the wires. (See Fig. 7.) The upper portions of the channel-irons will be provided with the clamping devices heretofore described, the bolts of which will space the said channel-irons. In this form and also that shown in Figs. 4 and 5 the wires engaging the post above the reinforcing bar or plates will be secured to the channel-irons directly in any desired way.

In Fig. 8 I have shown a cross-section of another slight modification of my improved post, in which $A^2 A^2$ are the channel-irons and $A^3 A^3$ are flat reinforcing bars or plates engaging the inner faces of the channel-irons between their lateral flanges for a short distance above and below the ground-line, said reinforcing-bars being secured to the channel-irons by rivets or bolts. In this form the channel-irons are clamped together by the same clamping devices previously described and spaced by the bolts thereof.

What I claim, and desire to secure by Letters Patent, is—

1. A fence-post comprising among its members, a pair of channel-irons, having their flanges extending toward each other, a reinforcing device engaging the interior of said channel-irons, adjacent to the ground-line and lying wholly within the same, and clamping devices for clamping said parts together, substantially as described.

2. A fence-post comprising among its members, a pair of channel-irons having their lateral flanges extending toward each other, a reinforcing-bar having flanged portions engaging said channel-irons between said lateral flanges and a web connecting said flanged portions disposed perpendicularly thereto and clamping devices for securing said parts together, substantially as described.

3. A fence-post comprising among its members a pair of channel-irons having their lateral flanges extending toward each other, a reinforcing-bar having a central web, provided with apertures for the passage of fence-wires, and having flanged portions perpendicular to said web for engaging said channel-irons within said lateral flanges, clamping-plates engaging the exterior of said flanges on opposite sides of the post, and having retaining projections to prevent the separation of said channel-irons, and clamping-bolts passing through the web of said reinforcing-bar, and between adjacent edges of said lateral flanges, and engaging said clamping-plates, substantially as described.

4. A fence-post comprising among its members a pair of channel-irons having their lateral flanges extending toward each other, the reinforcing-plates engaging the interior of said channel-irons lying wholly within the same between their lateral flanges and rigidly secured thereto, clamping-plates engaging the exterior of said lateral flanges, having retaining projections for preventing the separation of said channel-irons and clamping-bolts engaging said clamping-plates and passing between the edges of said channel-irons substantially as described.

In testimony whereof I affix my signature in presence of two witnesses.

RICHARD B. ROBBINS.

Witnesses:
DORA RENIFF,
E. L. MILLS.